United States Patent [19]
Inaishi et al.

[11] Patent Number: 5,980,621
[45] Date of Patent: Nov. 9, 1999

[54] HOT-MELT INK

[75] Inventors: Kouji Inaishi, Okazaki; Masahiro Nishizaki, Nagoya, both of Japan

[73] Assignee: Brother Kogyo Kabushiki Kaisha, Nagoya, Japan

[21] Appl. No.: 09/075,936

[22] Filed: May 12, 1998

[30] Foreign Application Priority Data

May 15, 1997 [JP] Japan ..................................... 9-143052

[51] Int. Cl.$^6$ .................................................. C09D 11/00
[52] U.S. Cl. ..................................... 106/31.29; 106/31.31; 106/31.61; 106/31.63
[58] Field of Search ............................ 106/31.29, 31.31, 106/31.61, 31.63

[56] References Cited

U.S. PATENT DOCUMENTS

| | | |
|---|---|---|
| 3,653,932 | 4/1972 | Berry et al. . |
| 4,390,369 | 6/1983 | Merritt et al. . |
| 4,659,383 | 4/1987 | Lin et al. . |
| 4,758,276 | 7/1988 | Lin et al. . |
| 4,820,346 | 4/1989 | Nowak . |
| 4,851,045 | 7/1989 | Taniguchi .............. 106/31.63 |
| 5,000,786 | 3/1991 | Matsuzaki . |
| 5,124,719 | 6/1992 | Matsuzaki . |
| 5,397,388 | 3/1995 | Fujioka ................ 106/31.61 |
| 5,405,438 | 4/1995 | Fujioka ................ 106/31.61 |
| 5,409,530 | 4/1995 | Kanbayashi et al. ......... 106/31.61 |
| 5,531,819 | 7/1996 | Sawada . |
| 5,662,736 | 9/1997 | Sakai et al. ............... 106/31.61 |
| 5,669,965 | 9/1997 | Sawada et al. ............ 106/31.61 |
| 5,788,751 | 8/1998 | Sawada ................. 106/31.72 |

FOREIGN PATENT DOCUMENTS

| | | |
|---|---|---|
| 0 610 090 A1 | 8/1994 | European Pat. Off. . |
| 0 737 727 A2 | 10/1996 | European Pat. Off. . |
| 0 739 958 A2 | 10/1996 | European Pat. Off. . |
| 58-108271 | 6/1983 | Japan . |
| 59-22973 | 2/1984 | Japan . |
| 61-83268 | 4/1986 | Japan . |
| 62-48774 | 3/1987 | Japan . |
| 62-295973 | 12/1987 | Japan . |
| 2-29471 | 1/1990 | Japan . |
| 2-167373 | 6/1990 | Japan . |
| WO 96/28305 | 9/1996 | WIPO . |

OTHER PUBLICATIONS

R.H. Leach, "The Printing Ink Manual" Fifth Edition, pp. 270–271, 1993.

*Primary Examiner*—Mark L. Bell
*Assistant Examiner*—Veronica F. Faison
*Attorney, Agent, or Firm*—Oliff & Berridge, PLC

[57] ABSTRACT

A hot-melt ink includes an amide resin component and a wax component. The wax component includes at least montan ester wax and a ketone wax, and these waxes are contained in a total amount of at least 50 wt % based on the total amount of the hot-melt ink.

6 Claims, No Drawings

HOT-MELT INK

BACKGROUND OF THE INVENTION

1. Field of the Invention

The present invention relates to a hot-melt ink for use in ink-jet recording systems.

2. Related Art of the Invention

Ink-jet recording systems include electric field-controlled systems wherein electrostatic attraction is employed for ink ejection; drop-on-demand systems (pressure pulse systems) wherein the vibrational pressure provided by piezo elements is employed for ink ejection; and thermal ink-jet recording systems wherein-the pressure produced by bubbles formed and expanded using high heat is employed for ink ejection. These systems all afford printed images of high detail.

The inks employed in such ink-jet recording systems are ordinarily water-based inks, in which water is the principal solvent, and oil-based inks, in which an organic solvent is the principal solvent. Images printed using water-based inks on the whole have inferior water resistance; in contrast, using oil-based inks it is possible to produce printed images exhibiting excellent water resistance.

Since these water-based inks and oil-based inks are liquid at room temperature, feathering tends to occur as images are printed onto recording paper by use of these inks, and an adequate print density can not be obtained. Because these inks are liquids, they tend to cause the formation of deposits from the inks, whereby the reliability of ink-jet recording systems becomes degraded.

Hot-melt inks, which are solid at ambient temperature, have been proposed as a means for overcoming the drawbacks of the inks pertaining to the prior art, which are liquid at room temperature. U.S. Pat. No. 3,653,932 teaches an ink containing a dialkyl ester of sebacic acid. U.S. Pat. No. 4,390,369 and Japanese Patent Application Laid-Open No. 58-108271 teach inks containing natural waxes. Japanese Patent Application Laid-Open No. 59-22973 teaches an ink containing stearic acid, while Japanese Patent Application Laid-Open No. 61-83268 teaches an ink containing an acid or alcohol with 20 to 24 carbon atoms and a ketone having a relatively high melting point. Japanese Patent Application Laid-Open No. 62-48774 teaches an ink containing a thermosetting resin that has a high hydroxyl value, a solid organic solvent with a melting above 150° C., and a small quantity of dyestuff. Japanese Patent Application Laid-Open No. 2-167373 teaches an ink containing coloring matter, a first solvent that is solid at room temperature and that liquefies when heated to a temperature above room temperature, and a second solvent that dissolves the first solvent and that is a highly volatile liquid at room temperature, Japanese Patent Application Laid-open No. 62-295973 teaches an ink containing a synthetic wax that has polar groups and a dye which is soluble in this synthetic wax. Japanese Patent Application Laid-Open No. 2-29471 teaches an ink containing ketones, amide waxes, waxes, and coloring matter.

Hot-melt inks are heated to a given temperature in the ink reservoir, recording head, and other components to produce a molten state exhibiting the desired viscosity, about 5 to 20 cps. In ink-jet recording systems, the viscosity is selected with reference to parameters such as the ink jetting hole diameter and the distance of the recording head from the recording paper. Accordingly, a drop in viscosity over time can result in satellite production, while a rise in viscosity can result in increased drop diameter, and the quality of the printed image is impaired. Thus, it is necessary that the viscosity of the molten ink not fluctuate significantly over extended periods. The hot-melt inks of the prior art, however, have poor thermal storage properties, and are susceptible to changes in viscosity.

SUMMARY OF THE INVENTION

The present invention was developed in order to overcome the aforementioned problems, and has as an object to provide a hot-melt ink that exhibits good thermal storage properties in the molten state, and that does not undergo changes in viscosity.

The aforementioned object is achieved through a hot-melt ink comprising an amide resin component and a wax component, wherein the wax component comprises at least a montan ester wax and a ketone wax, and the montan ester wax and the ketone wax are contained in a total amount of at least 50 wt % based on the total amount of the hot-melt ink.

This and other objects, features and advantages of the present invention are described in or will become apparent from the following detailed description of the invention.

DETAILED DESCRIPTION OF THE INVENTION

The hot-melt ink of the present invention ink comprises an amide resin component and a wax component.

In the present invention, the aforementioned wax component comprises at least a montan ester wax and a ketone wax.

There are no particular restrictions regarding the aforementioned montan ester wax. Examples of the montan ester wax include those containing as the principal component an ester of a $C_{20-40}$ fatty acid with tetracosyl alcohol, hexacosyl alcohol, octacosyl alcohol, tricontanyl alcohol, or other alcohol.

There are no particular restrictions regarding the aforementioned ketone wax. Examples of the ketone wax include stearones such as T-1 (manufactured by Kao Corporation) and laurones such as LAURONE (manufactured by Kanto Kagaku Co.,Ltd.). These may be used individually or in combinations of two or more.

In the present invention, the total amount of the montan ester wax and the ketone wax constitutes at least 50 wt % based on the total amount of the hot-melt ink. If the amount is less than 50 wt %, thermal storage properties decline and the viscosity fluctuates in a great extent. The amount is preferably 59 wt % or more.

The hot-melt ink of the present invention exhibits excellent thermal storage properties, undergoing a change in viscosity of less than 1 cps even when stored for 10 days at 115° C.

The fact that the change in viscosity with storage for 10 days at 115° C. can be held to less than 1 cps by including the montan ester wax and the ketone wax in a total amount constituting at least 50 wt % based on the total amount of the hot-melt ink was discovered by the inventors, and represents the basis on which the present invention was perfected.

The aforementioned wax component may include other waxes in addition to the aforementioned montan ester wax and ketone wax. There are no particular restrictions regarding the other waxes. Examples of the other waxes include paraffin wax, microcrystalline wax, and other petroleum waxes; candelilla wax, carnauba wax, rice wax, solid jojoba wax, and other vegetable-derived waxes; beeswax, lanolin, spermaceti wax, and other animal-derived waxes; montan wax and other mineral waxes; Fischer-Tropsch wax, polyethylene wax, and other synthetic hydrocarbon waxes; hardened castor oil, hardened castor oil derivatives, and other hydrogenated waxes; montan wax derivatives, polyethylene wax derivatives, and other modified waxes; behenic acid, stearic acid, palmitic acid, myristic acid, lauric acid, and other higher fatty acids; stearyl alcohol, behenyl alcohol, and other higher alcohols; 12-hydroxystearic acid, 12-hydroxystearic acid derivatives, and other hydroxystearic acids; dodecylamine, tetradecylamine, octadecylamine, and other amines; methyl stearate, octadecyl stearate, glycerol fatty acid esters, sorbitan fatty acid esters, propylene glycol fatty acid esters, ethylene glycol fatty acid esters, polyoxyethylene fatty acid esters, and other esters; α-olefin-maleic anhydride copolymer waxes and other polymer waxes; and lauric acid amide, stearic acid amide, stearyl stearic acid amide, oleic acid amide, erucic acid amide, ricinoleic acid amide, 12-hydroxystearic acid amide, special fatty acid amides, N-substituted fatty acid amides, and other monoamide waxes. These may be used individually or in combinations of two or more.

There are no particular restrictions regarding the aforementioned amide resin component. Examples of the amide resin component include commercially available products such as BIRTHAMIDE 335 and 725 (manufactured by Henkel Hakusui corporation), TOHMIDE 90 and 92 (manufactured by Fuji Kasei Kogyo Co., Ltd.), SUNMIDE 550 and 55 (manufactured by Sanwa Kagaku Kogyo K. K.).

The hot-melt ink of the present invention may optionally contain antioxidants, coloring matter, and the like.

There are no particular restrictions regarding the antioxidant. Examples of the antioxidant include IRGANOX 1010 (manufactured by Ciba-Geigy Corporation) and the like.

There are no particular restrictions regarding the coloring matter, with the proviso that it is a pigment or dye used in oil-based ink compositions of the prior art.

There are no particular restrictions regarding the aforementioned pigment. Any pigment commonly used in the field of printing, either organic or inorganic, may be employed. Examples of the pigment include carbon black, cadmium red, molybdenum red, chrome yellow, cadmium yellow, titan yellow, chromium oxide, viridian, titan cobalt green, ultramarine blue, Prussian blue, cobalt blue, azo pigments, phthalocyanine pigments, quinacridone pigments, isoindolinone pigments, dioxazine pigments, threne pigments, perylene pigments, perinone pigments, thioindigo pigments, quinophthalone pigments, metal complex pigments, and the like. These may be used individually or in combinations of two or more.

There are no particular restrictions regarding the aforementioned dye. Examples of the dye include azo dyes, disazo dyes, metal complex salt dyes, naphthol dyes, anthraquinone dyes, indigo dyes, carbonium dyes, quinoneimine dyes, cyanine dyes, quinoline dyes, nitro dyes, nitroso dyes, benzoquinone dyes, naphthoquinone dyes, xanthene dyes, phthalocyanine dyes, metal phthalocyanine dyes, and other oil-soluble dyes. These may be used individually or in combinations of two or more. They may also be used in conjunction with the pigments listed above. The hot-melt ink of the present invention can be prepared by heating and melting the amide resin, montan ester wax, ketone wax, and any other ingredients to 70 to 250° C. and preferably 100 to 200° C., stirring and mixing at 200 to 10,000 rpm and preferably 500 to 5000 rpm using a dissolver or other stirring device, and then filtering the resultant ink composition through a mesh filter or the like.

EXAMPLES

The present invention will be illustrated in further detail below through the following working examples. The present invention should not be limited to these working examples.

Example 1

A hot-melt ink having the formulation indicated in Table 1 was prepared using an amide wax (SUNMIDE 550, manufactured by Sanwa Kagaku Kogyo K.K.). a ketone wax (T-1, manufactured by Kao Corporation), a montan ester wax, an olefin-maleic anhydride wax, and a red dye.

The resultant hot-melt ink was subjected to measurement to determine the change in viscosity with storage at 115° C. for 10 days. Results are presented in Table 1.

TABLE 1

| | |
|---|---|
| Amide resin | 31 parts by weight |
| Ketone wax | 38 parts by weight |
| Montan ester wax | 21 parts by weight |
| Olefin-maleic anhydride wax | 8 parts by weight |
| Red dye | 2 parts by weight |
| Viscosity change | 0.3 cps |

Example 2

A hot-melt ink having the formulation indicated in Table 2 was prepared using an amide wax (SUNMIDE 550, manufactured by Sanwa Kagaku Kogyo K.K.), a ketone wax (T-1, manufactured by Kao Corporation), a montan ester wax, and a blue dye.

The resultant hot-melt ink was subjected to measurement to determine the change in viscosity with storage at 115° C. for 10 days. Results are presented in Table 2.

TABLE 2

| | |
|---|---|
| Amide resin | 36 parts by weight |
| Ketone wax | 39 parts by weight |
| Montan ester wax | 23 parts by weight |
| Blue dye | 2 parts by weight |
| Viscosity change | 0.4 cps |

Comparative Example 1

A hot-melt ink having the formulation indicated in Table 3 was prepared using an amide wax (SUNMIDE 550, manufactured by Sanwa Kagaku Kogyo K.K.), a ketone wax (T-1, manufactured by Kao Corporation), an olefin-maleic anhydride wax, and a red dye.

The resultant hot-melt ink was subjected to measurement to determine the change in viscosity with storage at 115° C. for 10 days. Results are presented in Table 3.

TABLE 3

| | |
|---|---|
| Amide resin | 31 parts by weight |
| Ketone wax | 41 parts by weight |
| Olefin-maleic anhydride wax | 19 parts by weight |
| Red dye | 2 parts by weight |
| Viscosity change | 1.1 cps |

Comparative Example 2

A hot-melt ink having the formulation indicated in Table 4 was prepared using an amide wax (SUNMIDE 550, manufactured by Sanwa Kagaku Kogyo K.K.), a ketone wax (T-1, manufactured by Kao Corporation), a montan ester wax, and a blue dye.

The resultant hot-melt ink was subjected to measurement to determine the change in viscosity with storage at 115° C. for 10 days. Results are presented in Table 4.

TABLE 4

| Amide resin | 49 parts by weight |
|---|---|
| Ketone wax | 37 parts by weight |
| Montan ester wax | 12 parts by weight |
| Blue dye | 2 parts by weight |
| Viscosity change | 1.9 cps |

The hot-melt ink of the present invention has the constitution described above, whereby it exhibits good thermal storage properties in the molten state, and undergoes virtually no change in viscosity in the ink reservoir, recording head, or other components. Thus, stable ink projection behavior can be maintained over extended periods, affording high quality printed images.

The entire disclosure of the specification, claims and summary of Japanese Patent Application No. 9-143052 filed on May 15, 1997 is herein incorporated by reference in its entirety.

What we claim is:

1. A hot-melt ink comprising an amide resin component and a wax component, wherein said wax component comprises at least a montan ester wax and a ketone wax, and said montan ester wax and said ketone wax are contained in a total amount of at least 50 wt % based on the total amount of the hot-melt ink.

2. The hot-melt ink according to claim 1, wherein the montan ester wax is at least one member selected from the group consisting of montan ester waxes containing as a principal component an ester of $C_{20-40}$ fatty acid with tetracosyl alcohol, hexacosyl alcohol, octacosyl alcohol, tricontanyl alcohol, or other alcohol.

3. The hot-melt ink according to claim 1, wherein the ketone wax is at least one member selected from the group consisting of stearones and laurones.

4. The hot-melt ink according to claim 1, wherein the montan ester wax and the ketone wax are contained in a total amount of 59 wt % or more based on the total amount of the hot-melt ink.

5. The hot-melt ink according to claim 1, wherein the hot-melt ink undergoes a change in viscosity of less than 1 cP when stored for 10 days at 115° C.

6. The hot-melt ink according to claim 1, wherein said wax component further comprises a third wax different from said montan ester wax and said ketone wax.

\* \* \* \* \*